Nov. 30, 1965    O. FREY ETAL    3,221,076
CRACKING OF HYDROCARBONS
Filed Dec. 21, 1960
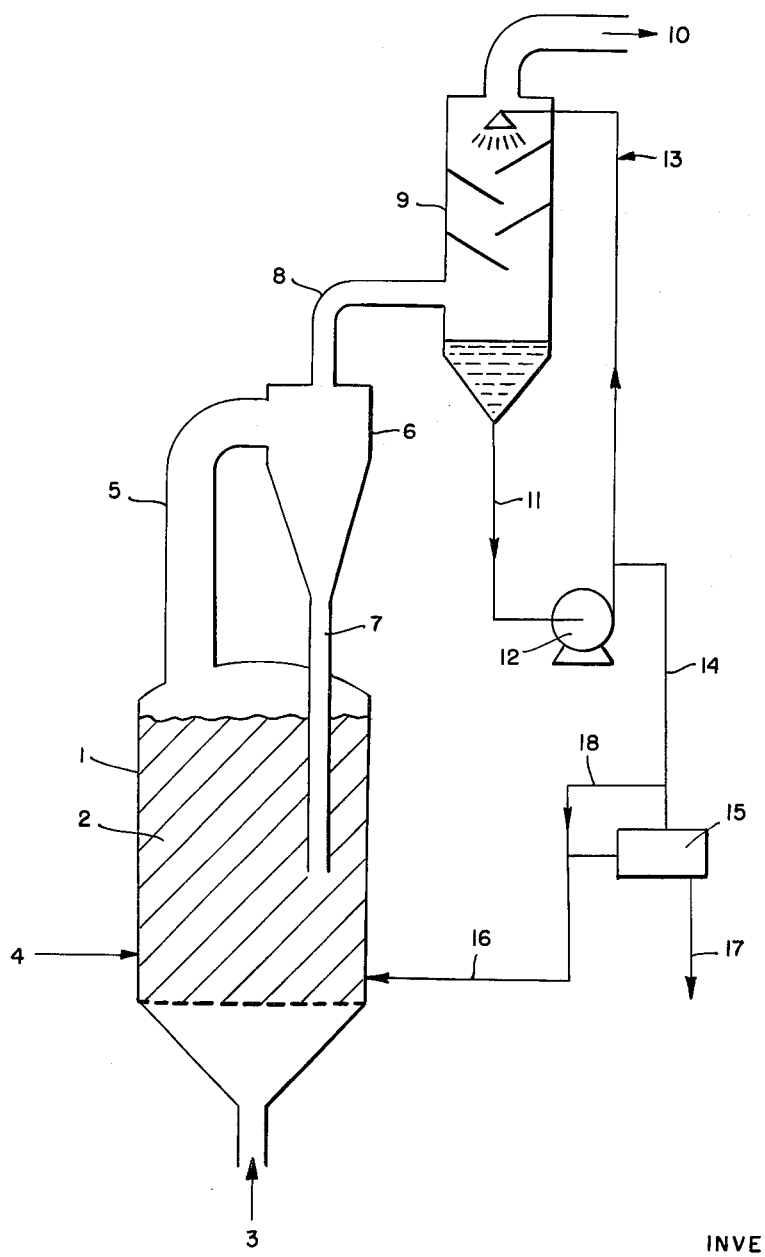
INVENTORS:
OTTO FREY
GOTTFRIED RICHTER
KARL SCHUHMANN
BY
ATT'YS 3,221,076
CRACKING OF HYDROCARBONS
Otto Frey, Gottfried Richter, and Karl Schuhmann, all of Ludwigshafen (Rhine), Germany, assignors to Badische Anilin- & Soda-Fabrik Aktiengesellschaft, Ludwigshafen (Rhine), Germany
Filed Dec. 21, 1960, Ser. No. 77,303
Claims priority, application Germany, Dec. 22, 1959, B 55,990
9 Claims. (Cl. 260—683)

This invention relates to a process for the cracking of gaseous and/or liquid hydrocarbons for the production of gaseous olefines, especially ethylene, in a fluidized layer of granular inert or carbonaceous solids at temperatures of about 630 to 850° C.

It is known to crack gaseous or liquid hydrocarbons for the production of gaseous olefines, especially ethylene, in the presence of steam and/or oxygen-containing gases by introducing the initial materials into a layer of heated solids which are kept in fluidized motion by gases or vapors, at temperatures between 650° and 850° C. Part of the solids, especially the fine-grained or dust-like solids, is always entrained from the fluidized layer by the effluent reaction gases and separated from the same by suitable means, as for example by a cyclone, and returned to the fluidized layer. After leaving the cyclone, the gaseous and vaporous reaction products are usually quenched or washed with a high boiling hydrocarbon fraction so that residual amounts of solids which have not been separated in the cyclone by reaction of their small grain size are taken up by the quenching and/or washing liquid. Conversion in the said process is dependent among other things on the grain size distribution of the material being fluidized. Since however the solids in the fluidized layer are constantly exposed to attrition during fluidization, the composition of the fluidized material is displaced in the direction of an increase in the proportion of the finer grain sizes. This displacement of the composition of the fluidized material has the disadvantage that the amount of solids carried out from the fluidized layer increases and this is attended by an ever-increasing load on the cyclone separator. It has therefore been proposed to maintain the desired composition of the fluidized material by continual separation of part of the fine-grained constituents, for example by withdrawing part of the fluidized material from the fluidized layer, and separating the finer constituents by screening while returning the coarser constituents to the fluidized layer. This solution to the problem has the disadvantage that a relatively large amount of fluidized material must be withdrawn in order to sieve out the fine constituents. In addition to the necessary expenditure for apparatus, there is a loss of heat energy by cooling the fluidized material prior to screening and re-heating prior to or after entry into the fluidized layer.

The present invention is an improvement of a process for cracking gaseous and/or liquid hydrocarbons for the production of gaseous olefines, especially ethylene, in a fluidized layer of granular inert or carbonaceous solids at temperatures of about 630° to 850° C., possibly with an addition of steam and/or oxygen-containing gases, according to which the major portion of the solids entrained from the fluidized layer by the reaction products is separated in a cyclone above the fluidized layer and returned to the fluidized layer.

The invention relates to a process of the said kind in which the gaseous and vaporous reaction products, after leaving the cyclone, are contacted with hydrocarbons so that the fine-grained constituents of the fluidized material which are not separated in the cyclone are absorbed by the high boiling fraction of the hydrocarbons and prior to the return of the same to the fluidized layer are wholly or partly discharged.

It is an object of the present invention to produce gaseous olefines, especially ethylene in addition to propylene, butylene and butadiene. Besides gaseous olefines, large amounts of utilizable carbon monoxide and hydrogen as well as high-boiling cracking oils are formed in the process. The cracking oils can be returned to the process for cracking or used as quenching liquid.

The new process has the advantage that the composition of the fluidized material can be kept constant as regards the size distribution of its constituents in a simple manner or can be displaced in favor of the proportion of coarse grained constituents. The amount of fluidized material circulated is also diminished because when withdrawing fluidized material direct from the fluidized layer, an amount must be withdrawn which is a multiple of the amount of fine-grained constituents to be separated. In the process according to this invention, the function of the screen is taken over by the cyclone separator. The increase in the proportion of coarse-grained constituents in the fluidized material lessens the load on the cyclone separator and makes possible an increase in throughput.

In the process according to the present invention, liquid hydrocarbons or hydrocarbon mixtures are used as initial materials. The process lends itself especially to the cracking of crude petroleum. Fractions such as occur in the distillation of petroleum, e.g., naphtha, gas oil or any other mineral oil, such as high-boiling petroleum residues, e.g., residues, boiling above about 300° C., occurring in mineral oil distillation. If desired, gaseous hydrocarbons, especially paraffins, from which olefines can be prepared by the splitting off of hydrogen, e.g., ethane, propane, butane or mixtures thereof, may be added to the said initial materials, i.e. in quantities up to 50% by weight of the total initial material.

The initial materials are advantageously introduced into the fluidized layer in vapor form or preheated. Cracking in the fluidized layer is carried out at temperatures of 630° to 850° C., preferably at temperatures of 700° to 830° C. It is usual to work at normal pressure, preferably slightly above atmospheric pressure, for example at 1.2 to 1.5 atmospheres.

The fluidization agent may be an inert gas or vapor. It is advantageous to use steam, to which inert gases or vapors may be added. The temperature necessary for the cracking may be produced by partial combustion of the initial materials with oxygen or gases containing oxygen, for example air, or mixtures of air and oxygen. It is advantageous to use technical-grade oxygen recovered from liquefied air, which usually has a purity of 98%.

The fluidized material may be granular inert or carbonaceous solids, advantageously in grain sizes of 5 to 10,000 microns, and it is desirable to maintain a grain size distribution during the process in which the bulk of the fluidized material is present in grain sizes of 100 to 3000 microns. When using oil coke formed in the cracking as the fluidized material, part of the same may be returned to the fluidized layer together with the high boiling cracked products and used for the production of the necessary cracking energy by combustion. If in the combustion of the solids-containing hydrocarbons returned to the fluidized layer an excess of oil coke is formed, the latter may be removed directly from the fluidized layer. When using inert solids as the fluidized material, the portion of fine-grained solids discharged can be replaced by introducing a corresponding amount of coarse-grained material in order to maintain the desired grain size distribution. By inert solids we understand substances that are not used up during the reaction, e.g., ceramic material, natural and synthetic silicates such as corundum and sillimanite, and sand.

By the method according to our invention, the bulk of the fluidized material, i.e., at least 50%, preferably 70–95% by weight, of the fluidized material is kept within the desired grain size range of 100–3000 μ diameter.

The cyclone is advantageously adjusted so that 90 to 99.5% of the solids entrained from the fluidized layer by the gaseous and vaporous products are separated in the cyclone. This fraction of the solids is preferably returned from the cyclone directly into the fluidized layer. By the method according to our invention, the bulk of the fluidized material, i.e., at least 50% by weight, preferably 70–95% by weight, is kept within the desired grain size range of 100–3000 μ in diameter. The gaseous and vaporous reaction products leaving the cyclone separator are contacted with high-boiling hydrocarbons, advantageously hydrocarbon fractions which boil above 250° C., preferably above 280° C., e.g., between 300° and 650° C., and thereby cooled and separated from the high-boiling fraction and the fine-grained portion of the solids not separated in the cyclone. As the cooling and washing liquid it is advantageous to use the high-boiling hydrocarbons formed in the process, for example a hydrocarbon fraction with a boiling point above 250°, e.g., 300° to 650° C.

By the treatment with the cooling and washing liquid, part of the gaseous and vaporous hydrocarbons is evaporated, while the liquid portions absorb the fine-grained solids which have not been separated in the cyclone. The degree of vaporization depends on the temperature of the gaseous reaction products and the temperature and amount of washing and cooling liquid used. By quenching, the gaseous and vaporous reaction products should be cooled to such a temperature that side reactions which reduce the yield of ethylene are avoided. The hydrocarbon fraction used for cooling and washing the gaseous and vaporous reaction products is advantageously circulated with a pump, part of the hydrocarbon solids suspension, e.g., 0.1 to 10% by weight, being removed and the amount of hydrocarbon removed being continually replenished through a supply pipe. The hydrocarbon/solids suspension removed from the circulation may be led through a continuously operating centrifuge in which the fine grained solids are wholly or partly separated. We prefer to separate 30 to 100% by weight, preferably 80 to 100% by weight, of the fine-grained solids contained in the hydrocarbon/solids suspension. When using inert solids as the material to be fluidized it is advantageous to remove the fine-grained fraction completely. It is however also possible to incorporate the separating device in a branch pipe and to control the separation of the fine-grained solids by regulating the strength of the stream of liquid into the branch pipe. The separated solid is withdrawn and the hydrocarbon, which may still contain solids, returned to the fluidized layer.

The following example will illustrate the invention without limiting it and is given with reference to the accompanying drawing which is a diagrammatic sectional elevation of an apparatus suitable for carrying out the process according to the invention.

*Example*

A shaft furnace 1 having a cross-section of 1 square meter is provided with a metal grate having fine slots on which rests a fluidized layer 2 of oil coke with a granulation of 20 to 3000 microns. A mixture of 400 kilograms of superheated steam and about 300 cubic meters (S.T.P.) of oxygen is blown in per hour through a pipe 3. 780 kilograms per hour of a Near Eastern crude oil are introduced through a pipe 4. The amount of oxygen is regulated so that a temperature of about 720° C. prevails in the fluidized layer. About 4000 to 5000 cubic meters of gaseous and vaporous reaction products, which entrain solids from the fluidized layer, are withdrawn per hour through a pipe 5. The composition of the gaseous and vaporous reaction products is as follows:

| | Percent by weight |
|---|---|
| Steam | 22.4 |
| Vapors of heavy oils | 25.1 |
| Vapors of light oils | 6.7 |
| $CO_2$ | 15.0 |
| CO | 4.8 |
| $H_2$ | 0.4 |
| $N_2$ | 2.1 |
| Methane | 4.9 |
| Ethane | 2.1 |
| Propane | 0.5 |
| Ethylene | 7.4 |
| Propylene | 5.7 |
| Butylene | 1.5 |
| Butadiene | 1.4 |

The amount of crude oil and the amount of fluidizing agent are chosen so that about 10 metric tons of solids per hour are entrained by the gaseous and vaporous reaction products into the pipe 5. About 99.5% of these are separated in a cyclone 6 and returned through a pipe 7 into the fluidized layer. The degree of separation in the cyclone is dependent on the amount of crude oil and the height of the fluidized layer. The gaseous and vaporous reaction products together with the unseparated solids pass through a pipe 8 into an oil washing plant 9 in which the residual solids are washed out. The gaseous and vaporous reaction products then pass through a pipe 10 for further working up. Washing oil is circulated through a pipe 11 by a pump 12. An oil fraction of lower boiling point is supplied through a pipe 13; this vaporizes in the washing plant and cools the gaseous and vaporous reaction products to 250° C. The hydrocarbons boiling above 250° C. and the residual solids are led in an amount of about 400 kilograms per hour through a pipe 14 into a separating centrifuge 15 in which the solids are separated from the hydrocarbons. The hydrocarbons are returned through a pipe 16 into the fluidized layer, and the separated solids are withdrawn through a pipe 17. The separating centrifuge can be wholly or partly bypassed through a pipe 18.

The solids content of the washing oil is kept between 10 and 20% by weight so that 40 to 80 kilograms of solids are separated per hour from the mixture of oil and solids passing into the separating centrifuge 15. Without this separation of solids, the composition of the fluidized material would be displaced at the expense of the coarser particles and 70% by weight of the coke granules in the fluidized bed would have a diameter less than 200 microns. By the partial separation of the finer constituents, this proportion is diminished to 30% by weight. This measure permits an increase in the crude oil conversion of 30% namely from 600 kilograms to 780 kilograms per hour.

What we claim is:

1. In a process for the production of gaseous olefines by thermally cracking liquid hydrocarbons in a fluidized layer of granular solids at a temperature of from about 650° C. to 850° C. with separation in a cyclone of the bulk of the solids entrained in the effluent gaseous and vaporous reaction products, said separated solids being returned from said cyclone to said fluidized layer, the improvement which comprises: cooling and washing said effluent reaction products leaving said cyclone and still containing residual fine-grained solids in a quenching zone with a liquid hydrocarbon fraction of said effluent reaction products which boil above about 250° C. and which acts as a wash liquid for absorption of said residual solids from said effluent reaction products; recovering said effluent reaction products freed of said residual solids from said quenching zone; separately recovering said hydrocarbon wash liquid containing said residual solids from said quenching zone; and leading at least part of said wash liquid from said quenching zone into said fluidized layer after first discharging therefrom at least part of said residual solids, the quantity of residual solids separated from said wash liquid being sufficient to maintain at least 50% by weight of the granular solids in said fluidized layer within grain size of 100 to 3000 microns.

2. The process as claimed in claim 1 wherein crude petroleum is employed as the initial hydrocarbon being cracked in said fluidized layer.

3. The process as claimed in claim 1 wherein said wash liquid consists essentially of the liquid hydrocarbon fraction boiling above about 280° C.

4. The process as claimed in claim 1 wherein said wash liquid consists essentially of the liquid hydrocarbon fraction boiling between about 300° C. and 650° C.

5. The process as claimed in claim 1 wherein there is added to the liquid hydrocarbon being cracked in said fluidized layer up to 50% by weight thereof of a gaseous hydrocarbon selected from the group consisting of ethane, propane, butane and mixtures thereof.

6. The process as claimed in claim 1 wherein from 30 to 100% of said residual solids are separated from said hydrocarbon wash liquid prior to recycling said wash liquid from said quenching zone to said fluidized layer.

7. The process as claimed in claim 6 wherein from 80 to 100% of said residual solids are separated from said hydrocarbon wash liquid prior to recycling said wash liquid from said quenching zone to said fluidized layer.

8. The process as claimed in claim 6 wherein the quantity of residual solids separated from said wash liquid is sufficient to maintain at least 75% up to 95% by weight of the granular solids in said fluidized layer within a grain size of 100 to 3000 microns.

9. The process as claimed in claim 6 wherein the quantity of residual solids separated from said wash liquid is sufficient to maintain from 70 to 95% by weight of the granular solids in said fluidized layer within a grain size of 100 to 3000 microns.

References Cited by the Examiner
UNITED STATES PATENTS

| | | | |
|---|---|---|---|
| 2,768,127 | 10/1956 | Kimberlin et al. | 260—683 X |
| 2,776,930 | 1/1957 | McKeague et al. | 208—162 |
| 2,877,278 | 3/1959 | Moser | 260—683 |
| 2,899,475 | 8/1959 | Davison | 260—683 |
| 2,901,418 | 8/1959 | Pappas | 260—683 |

ALPHONSO D. SULLIVAN, *Primary Examiner.*

MILTON STERMAN, *Examiner.*